United States Patent
Abbasian et al.

(10) Patent No.: US 11,593,082 B2
(45) Date of Patent: Feb. 28, 2023

(54) REGISTERED APPLICATIONS FOR ELECTRONIC DEVICES

(71) Applicant: Apple Inc., Cupertino, CA (US)

(72) Inventors: Reza Abbasian, Los Gatos, CA (US); Steven J. Falkenburg, Los Altos, CA (US); Yongjun Zhang, Sunnyvale, CA (US); Charles H. Ying, San Mateo, CA (US); Nyla Khan, Santa Clara, CA (US); Grant Ritchie, Los Gatos, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 10 days.

(21) Appl. No.: 17/030,287

(22) Filed: Sep. 23, 2020

(65) Prior Publication Data

US 2021/0318888 A1 Oct. 14, 2021

Related U.S. Application Data

(60) Provisional application No. 63/008,577, filed on Apr. 10, 2020, provisional application No. 63/041,760, filed on Jun. 19, 2020.

(51) Int. Cl.
*G06F 8/61* (2018.01)
*G06F 9/445* (2018.01)
(Continued)

(52) U.S. Cl.
CPC ............... *G06F 8/61* (2013.01); *G06F 9/445* (2013.01); *G06F 11/302* (2013.01);
(Continued)

(58) Field of Classification Search
CPC .... G06F 9/445; G06F 11/302; G06F 11/3495; G06F 21/30; G06Q 20/326; G06Q 30/0185; G06K 7/1417
(Continued)

(56) References Cited

U.S. PATENT DOCUMENTS 8,600,803 B1 * 12/2013 Noth .................... H04L 67/289
705/14.1
10,353,686 B1 7/2019 Pasha et al.
(Continued)

OTHER PUBLICATIONS

Testud, E., Android Instant App, Incredible Web, May 13, 2016, 2 pages, [retrieved on Feb. 7, 2022], Retrieved from the Internet: <URL: https://www.incredible-web.com/blog/android-instant-apps/>.*

(Continued)

*Primary Examiner* — Geoffrey R St Leger
(74) *Attorney, Agent, or Firm* — BakerHostetler

(57) ABSTRACT

The subject technology provides a portion of the functionality of an application on an electronic device on which the application is not installed. The portion of the functionality of the application is provided by a clip of the application that can be obtained, installed, and launched on the user device, at the time the functionality is desired by a user, and without authenticating information for the user. The clip of the application can provide the user with access to a purchase function, an ordering function, or any other sub-function of the application. When the application itself is installed on the device, the clip of the application can be deleted while preserving access, by the application, to data generated on the device by the clip.

33 Claims, 7 Drawing Sheets

(51) Int. Cl.
*G06Q 30/00* (2012.01)
*G06Q 20/32* (2012.01)
*G06K 7/14* (2006.01)
*G06F 21/30* (2013.01)
*G06F 11/30* (2006.01)
*G06F 11/34* (2006.01)
*G06F 21/57* (2013.01)
*G06Q 30/018* (2023.01)

(52) U.S. Cl.
CPC .......... *G06F 11/3495* (2013.01); *G06F 21/30* (2013.01); *G06F 21/57* (2013.01); *G06K 7/1417* (2013.01); *G06Q 20/326* (2020.05); *G06Q 30/0185* (2013.01)

(58) Field of Classification Search
USPC .................................................. 717/174–178
See application file for complete search history.

(56) References Cited

U.S. PATENT DOCUMENTS

| | | | | |
|---|---|---|---|---|
| 2006/0212548 A1* | 9/2006 | Faisal | ..................... | G06F 9/453 709/220 |
| 2010/0235261 A1* | 9/2010 | Lloyd | ..................... | G06F 8/61 717/172 |
| 2011/0032250 A1* | 2/2011 | Tanaka | ..................... | A63F 13/77 345/418 |
| 2011/0306294 A1* | 12/2011 | Yamazaki | ............. | H04W 48/20 455/500 |
| 2013/0210404 A1* | 8/2013 | Curtis | ..................... | H04L 67/34 455/418 |
| 2013/0268885 A1* | 10/2013 | Lim | ..................... | G06F 3/04817 715/846 |
| 2014/0330881 A1* | 11/2014 | Stone | ................. | G06Q 30/0241 709/201 |
| 2015/0347262 A1* | 12/2015 | Vyas | ..................... | G06F 9/5022 718/104 |
| 2016/0112426 A1* | 4/2016 | Nguyen | ..................... | G06F 8/61 726/4 |
| 2018/0032741 A1* | 2/2018 | Hogben | .................. | H04W 4/60 |
| 2018/0101665 A1* | 4/2018 | Ogura | .................. | G06F 3/0486 |
| 2018/0248878 A1* | 8/2018 | El-Moussa | .......... | H04L 63/1483 |
| 2019/0052474 A1* | 2/2019 | Dizengof | ............ | H04L 65/1046 |
| 2019/0121628 A1* | 4/2019 | Hu | ........................ | H04L 67/306 |
| 2019/0255384 A1 | 8/2019 | Bastide et al. | | |
| 2021/0019130 A1* | 1/2021 | Zou | ........................... | G06F 8/60 |
| 2021/0034378 A1* | 2/2021 | Morgan | ................ | H04W 4/021 |

OTHER PUBLICATIONS

Panzica La Manna, Valerio, et al., Towards a Framework for Proximity-based Hybrid Mobile Applications, MOBILESoft '18: Proceedings of the 5th International Conference on Mobile Software Engineering and Systems, May 2018, pp. 176-179, [retrieved on Oct. 7, 2022], Retrieved from the Internet: <URL:http://dl.acm.org/>.*

Liu, Yi, et al., Flexible Installability of Android Apps with App-level Virtualization based Decomposition, arxiv, Feb. 15, 2018, 14 pages, [retrieved on Feb. 5, 2022], Retrieved from the Internet: <URL:https://arxiv.org/abs/1712.00236>.*

International Search Report and Written Opinion from PCT/US2021/023302, dated Aug. 2, 2021, 16 pages.

Wikipedia, "High Capacity Color Barcode," retrieved from https://en.wikipedia.org/wiki/High_Capacity_Color_Barcode, last edited Apr. 17, 2020, 4 pages.

Written Opinion from PCT/US2021/023302, dated May 4, 2022, 6 pages.

* cited by examiner

REGISTERED APPLICATIONS FOR ELECTRONIC DEVICES

CROSS REFERENCE TO RELATED APPLICATIONS

This application claims the benefit of priority to U.S. Provisional Patent Application No. 63/041,760, entitled "Registered Applications for Electronic Devices" filed on Jun. 19, 2020, and also claims the benefit of priority to U.S. Provisional Patent Application 63/008,577, entitled "Application Clips for Electronic Devices" filed on Apr. 10, 2020, the disclosure of each of which is hereby incorporated herein in its entirety.

TECHNICAL FIELD

The present description including generally relates to applications for electronic devices and, more particularly, to registered applications such as application clips for electronic devices.

BACKGROUND

Users often install applications for performing various functions on their electronic devices, particularly mobile electronic devices. Prior to installing the application, the user typically accesses an application repository at a remote server, selects an application from the repository, provides authentication information and/or payment to the server, and after receiving access to the code based on the authentication, downloads the code of the application for installation. Typically, if a user attempts to access an application that is not installed on their device, the device re-routes the user to a web page associated with an owner of the application or offers the user an opportunity to authenticate, download, and install the application using the steps above.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology provides immediate access to a portion of an application's functionality, with a device on which the application has not been installed. This immediate access can be provided at a time when there is a current need for the portion of the application's functionality. The current need can be determined based, for example, on the location of the device, based on a scanned quick response (QR) code, or based on a selected link associated with the application.

This can be helpful, for example, when a user walks into a store without having installed the application for that store on their smart phone, smart watch, tablet, or other electronic device. Based on the user's location at the store, based on the user scanning a QR code provided by the store, or responsive to the user selecting a link associated with the store, a clip of the application (e.g., a purchase portion of the store's app, or an ordering portion of the store's app) can begin downloading while the user is provided with an option to authorize installation of the application clip. In this way, when the user authorizes the installation and/or launch, the application clip is immediately installed, launched, and ready to use. This process for obtaining a clip of an application (sometimes referred to herein as a reduced-functionality version of the application, a transient version of the application, a portion of the application, an application clip, or an app clip) can be performed without requiring authenticating information for the user, and without downloading the code for the full application, which can be undesirably time-consuming and/or resource-consuming.

Figure 1:
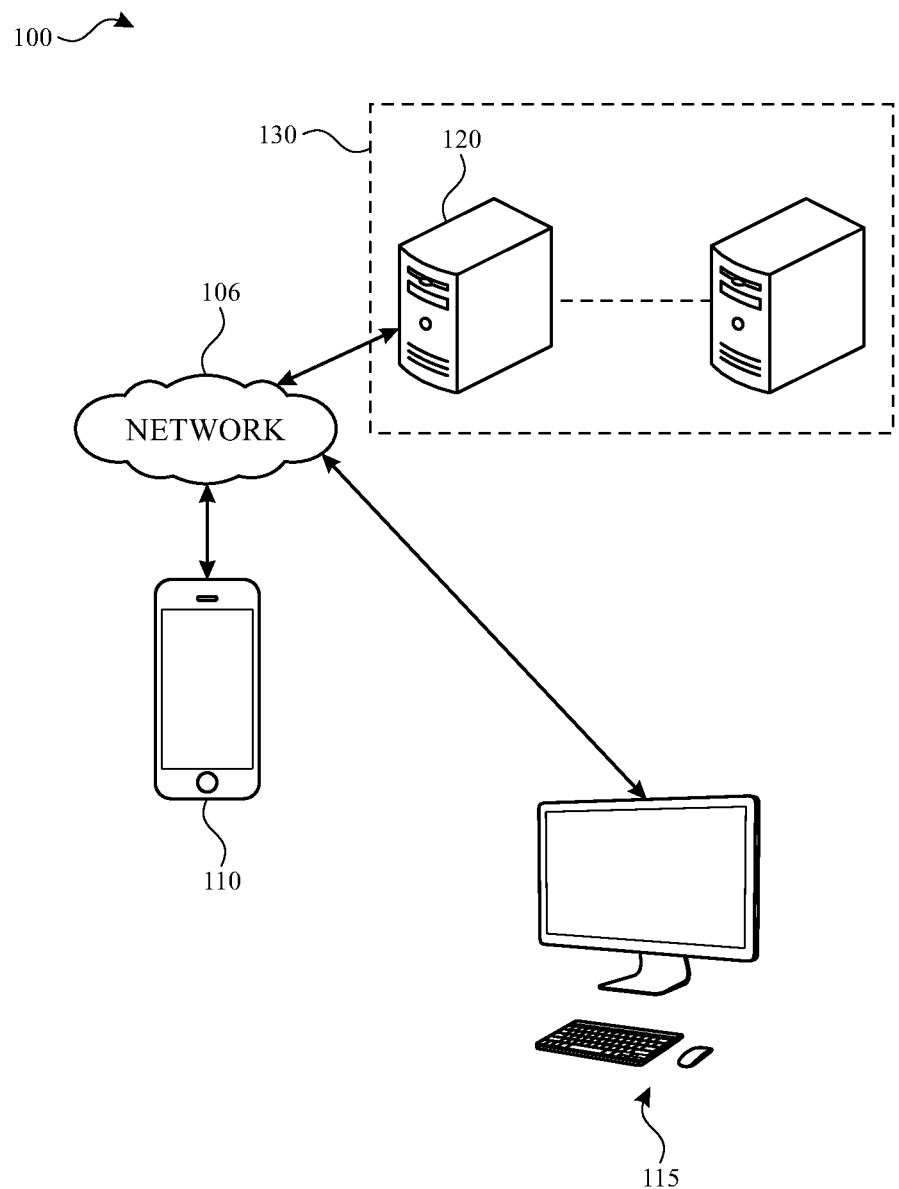
FIG. 1 illustrates an example network architecture in accordance with one or more implementations.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 110, an electronic device 115, and a server 120. For explanatory purposes, the system architecture 100 is illustrated in FIG. 1 as including the electronic device 110, the electronic device 115, and the server 120; however, the system architecture 100 may include any number of electronic devices, peripheral devices, and any number of servers or a data center including multiple servers.

The network 106 may communicatively (directly or indirectly) couple, for example, the electronic device 110, and/or the electronic device 115 with each other device and/or the server 120. In one or more implementations, the network 106 may be an interconnected network of devices that may include, or may be communicatively coupled to, the Internet.

The electronic device 110 may include a touchscreen and may be, for example, a smartphone, a portable computing device such as a laptop computer, a peripheral device (e.g., a digital camera, headphones), a tablet device, a wearable device that such as a watch, a band, and the like, any other appropriate device that includes, for example, a touchscreen, or any electronic device with a touchpad. In one or more implementations, the electronic device 110 may not include a touchscreen but may support touchscreen-like gestures. In one or more implementations, the electronic device 110 may include a touchpad. In FIG. 1, by way of example, the electronic device 110 is depicted as a mobile smartphone device with a touchscreen The electronic device 110 may be, for example, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. The electronic device 110 may be, and/or may include all or part of the electronic system discussed below with respect to FIG. 8. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 8.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for hosting an application repository, performing privacy-preserving mapping between uniform resource locators (URLs) and application identifiers, and/or verifying and/or authenticating users of the server (e.g., for access to applications in the application repository). In an implementation, the server 120 may function as a cloud server.

Figure 2:
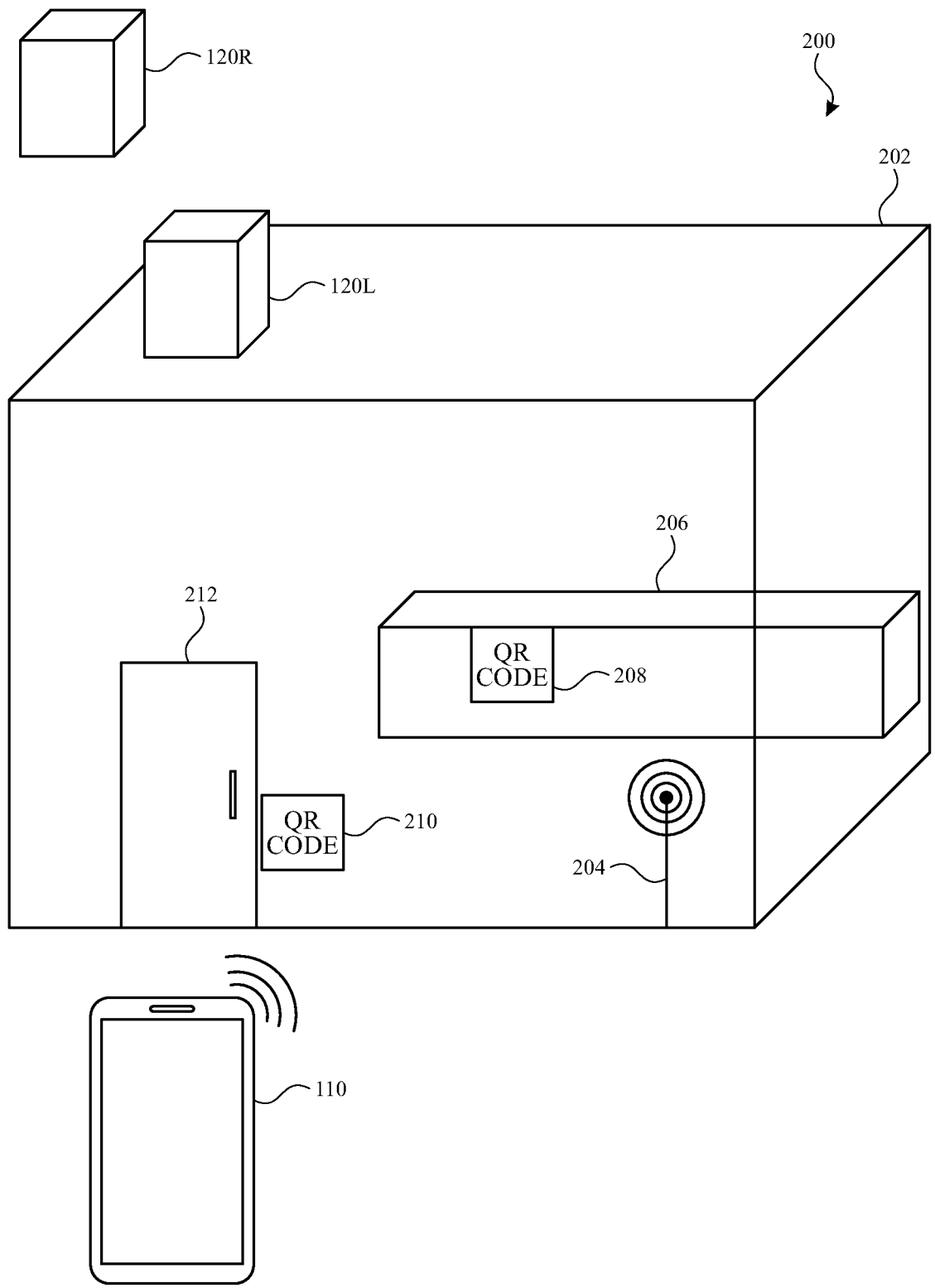
FIG. 2 illustrates an example environment in which a reduced-functionality version of an application can be provided in accordance with one or more implementations.

FIG. 2 illustrates an example environment 200 in which an electronic device may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The environment 200 includes an electronic device 110, a store 202, and a wireless access point 204 (e.g., a Wi-Fi access point, a cellular access point, an NFC access point, and/or the like). For explanatory purposes, the environment 200 is illustrated in FIG. 2 as including a single electronic device 110, a single store 202, and one wireless access point 204; however, the environment 200 may include any number of electronic devices, any number of stores, and any number of wireless access points.

The environment 200 allows for the electronic device 110 to identify at least a version of an application that is not installed on electronic device 110, the version of the application being available for immediate use with electronic device 110 (e.g., without authentication of a user account of a user of the electronic device 110).

In one or more implementations, multiple versions of the application may be available. Each version of a particular application, and the application itself (e.g., the full application) may have the same application identifier, or a same portion of the application identifier, in common with other versions of the same application. Each version of the application may be a reduced-functionality version of the application that has less functionality than a full version of the application. In some examples, the application may be an application associated with the store 202 (e.g., an application associated with a particular online and/or brick-and-mortar retailer).

The full version of the application may be obtained, such as from a remote server 120R, when the a user of electronic device 110 accesses an application repository at the remote server, selects the application from various applications in the application repository, provides authenticating information to the remote server 120R to verify access to a user account at the remote server 120R, downloads and installs the code for the application after the authenticating information is verified by the remote server, and then installs and launches the application.

The full version of the application may provide various functionalities such as a payment functionality, an online ordering functionality, a store locator functionality, an account access functionality, an application settings functionality, a search functionality, a helpdesk functionality, an order history functionality, a newsfeed functionality, an image capture functionality, a messaging functionality, a mapping functionality, etc. The full version of the application may be able to access, and/or request authorization to access, more components and/or more data at the electronic device 110 than a reduced-functionality version of the application. For example, the full version of the application may be able to request access to a photo library associated with the electronic device, where a reduced-functionality version of the application is prevented from requesting access to the photo library. In another example, a reduced-functionality version of the application may be able to access a subset of the components (e.g., sensors, cameras, etc.) that are accessible by the full application.

However, in various operational scenarios, the user may not need all of the functionality of the full application, and/or the user may not be able to, or desire to, spend the time and/or energy to locate, authenticate for, download, install, and launch the full application. For example, in the network environment of FIG. 2, the user of electronic device 110 may arrive and/or walk into store 202 without having installed the full application associated with the store on electronic device 110. However, the user may benefit from the ability to use one or more portions of the functionality of the application for store 202 while at the store. For example, the user may desire to use the payment functionality of the application to pay for a good or a service at the store 202. As another example, the user may desire to skip a line at the store by utilizing the online ordering functionality of the application. In one or more implementations, multiple reduced-functionality versions of the application (e.g., a payment functionality version, a ordering functionality version, an eat-in ordering functionality, a take-out ordering functionality, a reservations functionality, a mapping functionality, etc.) may be available.

In these scenarios, it may be helpful to provide the user with the ability to obtain one or more of the reduced-functionality versions of the application (sometimes referred to herein as a clip of the application, an application clip, a version of a full application having less functionality than the full application, a transient version of the application that has less functionality than the full application, or a portion of the application) without having to spend the time and energy of locating, authenticating for, downloading, and installing the full application. For example, the version of the application may be temporarily installed on electronic device 110 (e.g., when the user arrives at or enters store 202) and then deleted after a period of non-use (e.g., after the user leaves the store 202), when the user closes the version of the application, and/or when the user obtains the full version of the application. A version of an application such as a reduced-functionality version of an application (e.g., an app clip) can include functionality that is different from (or not included in) the full version of the application.

The environment 200 allows for the electronic device 110 to obtain a network identifier or network locator such as a uniform resource locator (URL) or a uniform resource identifier (URI) for an application (e.g., the full application associated with store 202) and to obtain, using the uniform resource locator, a transient version of the application that includes less functionality than a full version of the application.

A URL that identifies an application (e.g., the full application associated with store 202, or another registered application such as an application clip, or another experience) may, in one or more implementations, have the form codes-.server.com/experienceID?{arguments}, where "codes-.server.com" identifies a remote server with which the registered application is registered, "experienceID" is an identifier (e.g., a bundle identifier) of a registered application, and "{arguments}" includes one or more arguments and/or parameters to be used for installation of the registered application and/or to be passed to the registered application upon launch. The portion of the URL before the arguments, (e.g., codes.server.com/experienceID, or codes.server.com/experienceID) may be referred to as a prefix of the URL.

The environment 200 allows for the electronic device 110 to receive a uniform resource locator associated with an application; determine that the application is not installed on the electronic device 110; determine based on at least a first portion of the uniform resource locator, that at least a version of the application is available without user authentication; provide information associated with the uniform resource locator (e.g., an identifier of the application or an identifier of the version of the application) to one or more remote servers such as remote server 120R; receive, from the one or more remote servers, responsive to the information, code for at least the version of the application; provide a request for user authorization from a user to install and launch at least the version of the application; receive the user authorization; and, responsive to receiving the user authorization, install and launch at least the version of the application.

Electronic device 110 may determine, based on at least the first portion of the uniform resource locator, that at least the version of the application is available without user authentication, in part, by determining, at the electronic device, whether the URL is associated with an identifier of any application. Determining whether the URL is associated with an identifier of any application may include providing a hash of the URL (e.g., the entire URL or a portion of the URL) to a filter such as a Bloom filter at the electronic device and configured to return a positive result if the URL may map to an application identifier (e.g., at a server that stores registered mappings between URLs and application identifiers) or a negative result if the URL is not mapped to any application identifier. If the Bloom filter indicates that the URL does not map to any application identifier, the electronic device may navigate directly to the URL using a web browser.

In one or more implementations, electronic device 110 may provide one or more progressive subsets or truncations of the URL to the Bloom filter, if the Bloom filter indicates that the URL does not map to any application identifier based on the hash of the full URL (e.g., in a circumstance in which the Bloom filter does not include information for the arguments in a URL and thus indicates that the URL does not map to any application identifier). For example, electronic device 110 may progressively remove path or query component suffixes from the URL and check the result against the Bloom filter. For example, in one or more implementations, prior to navigating directly to the URL using a web browser, hashes of one or more one or more prefixes of the URL, obtained by progressively removing path or query component suffixes of the URL, can be provided to the Bloom filter to determine whether the URL likely corresponds to any application identifier. As examples, electronic device 110 may remove (e.g., disregard) a predetermined numbers of characters at the end of the URL, or characters following one or more special characters such as a question mark (?), a forward slash, a hashtag, etc.

Determining, based on at least the first portion of the uniform resource locator, that at least the version of the application is available without user authentication may include (e.g., if a local Bloom filter at the electronic device indicates that the URL may map to an application identifier) providing at least the first portion of the URL (e.g., a prefix of the URL, a hash of a prefix of the URL, a prefix of a hash of the URL, or a hash of the URL) to a remote server such as server 120 and receiving, from the remote server, one or more identifiers of applications and/or identifiers of versions of applications that are associated with at least the first portion of the URL.

In one or more implementations, determining that at least the version of the application is available can be done in a privacy-preserving operation in which the device sends a hash of the URL, a portion of a hash of the entire URL (e.g., a prefix of a full hash of the URL), or a hash of a portion of the URL to the server 120. The server 120 looks up a set or a "bucket" of information including application identifiers and/or application clip identifiers that correspond to that hash (e.g., the hashing algorithm may be designed to have multiple different URLs or portions thereof that hash to the same value) and then sends back the bucket of information including the identifiers of available versions of the applications and/or identifiers of the applications (e.g., and URLs or portions thereof that are associated with those identifiers in the bucket). The device may then determine locally whether an application and/or one or more versions of the application associated with the URL are included and/or identified in the bucket. If one or more versions of the application associated with the URL are included and/or identified in the bucket, the electronic device downloads, installs, and/or launches the version(s) of the application.

For example, in one or more implementations, the code for the version(s) of the application may be included in the bucket of data (e.g., along with the code for one or more other applications or version of applications in the bucket). In one or more other implementations, an identifier of the version(s) of the application may be obtained from the bucket and used to obtain the associated code for the version(s) of the application (e.g., from the same server that provided the bucket or from a separate server). For example, in one or more implementations, the bucket of data may be a bucket of metadata for various versions of various applications that is obtained from a first server (e.g., a registration server for registered applications). The metadata for each version of each application may include information (e.g., a name and/or an image) for display at the device in a request for authorization to install and launch the version of the application, and may include an identifier. The code for the desired version of the application may be obtained from a second server (e.g., an application server that is separate from the registration server) using the identifier in the bucket that corresponds to the URL. In this way, the device can identify versions of an application that are available, while avoiding, for example, revealing the location of the device or browsing or other activity of the user to the server (e.g., at least until the user authorizes installation and launch of a particular application or version of an application).

In one or more implementations, the code for the version(s) of the application may be obtained by first obtaining application metadata for the version of the applications from the application server using the identifier obtained from the bucket received from the registration server, providing a launch user interface using the obtained application metadata, obtaining the code for the version of the application from the application server using the identifier while showing the launch user interface at the device, and installing and launching the version of the application when the code is obtained. In one or more implementations (e.g., if user authorization has not been previously obtained using the data in the bucket), the application metadata for multiple versions and/or multiple applications may be obtained from the application server using multiple identifiers from the bucket received from the registration server. The device can select the appropriate application metadata with which to provide the appropriate launch user interface using the identifier, and can include a request for authorization to install and launch the version of the application in the launch user interface. Upon receiving authorization to install and launch the version of the application, the code for the version of the application can be downloaded, installed, and launched.

In one or more implementations, electronic device 110 may provide hashes of one or more prefixes of the URL, obtained by progressively removing path or query component suffixes from the URL, to the remote server (e.g., the registration server) if the first bucket does not include the application or one or more versions of the application associated with the URL. For example, in one or more implementations, prior to navigating directly to the URL using a web browser, hashes of one or more prefixes of the URL can be provided to the remote server to obtain additional buckets of information including application identifiers and/or application clip identifiers that correspond to that hash.

The electronic device 110 may determine that an application associated with the URL is not installed on the electronic device based on a local determination that the applications that are installed on the device are not associated with the URL (e.g. using URL information stored at the electronic device for the installed applications prior to determining whether any versions of the application are available) or using the application identifier(s) provided by the server (e.g., in the bucket).

In one or more implementations, the application clips and/or associated applications may be registered applications that are registered with a remote server (e.g., a registration server corresponding to one or more of servers 120). Although applications and application clips are described herein as examples of registered applications, other experiences that can be provided by an electronic device using a registered code that is registered at a remote server and obtained using the operations described herein are also contemplated.

Registered applications may have been previously registered with a server (e.g., registered with a registration server by the developer of the application). Registering the application may include providing a title, a subtitle, and an image for the application (e.g., that can be obtained as metadata in the bucket of information from the registration server and displayed to a user by their device with a request for authorization to install and launch the application). Registering the application may also include providing a URL for the application, and/or providing, generating, and/or linking one or more coded identifiers (e.g., QR codes, NFC codes, or other image based codes) to the URL. Registering the application may also include providing the machine (e.g., binary or executable) code for the application to the server or to another server (e.g., an application server corresponding to one or more other servers of servers 130).

Providing registered applications that are obtained as described herein (e.g., using privacy preserving operations and without requiring user authentication) can provide users of electronic devices with rapid access to new device functionality (e.g., functionality that was not previously installed on the device, to provide a new experience such as an application clip to the user) that is tailored to the user (e.g., to the current environment, actions, or location of the user) and that are high quality, secure applications.

In one or more implementations, the time for providing a user with access to the functionality of a registered application such as an application clip can be reduced by obtaining the code (e.g., binary code) for the registered application while requesting authorization from the user to install and launch the registered application. For example, a server such as server 120 may provide binary code for the registered application (e.g. binary code for an application clip or other experience associated with the registered application) to a user device in a first set of pre-fetched metadata (e.g., metadata that includes a registered title, subtitle, and image to be included in a request for user authorization to install and launch the application clip or other experience, as described in further detail hereinafter in connection with FIG. 3). In this way, the binary code can be downloaded while the user is viewing the authorization request. When the user accepts the authorization request, the device may then obtain/receive one or more key(s) from the server (e.g., the same server or another server) for use in unpacking and installing the already downloaded binary code.

In various scenarios, the uniform resource locator (URL) for the application may be obtained when the user clicks a link (e.g., a link on a web page, in an email or a text message, or a link within another application, such as a social media application, a voice-activated assistant application or any other application, running on electronic device 110), when the user scans (e.g., using a camera or an NFC component of the electronic device) a code associated with store 202 and/or a particular location, and/or based on the location of electronic device 110 (e.g. when electronic device 110, a local server 120L at store 202, and/or remote server 120R determine that electronic device 110 is at or near store 202 such as using geolocation operations and/or one or more wireless beacons).

In one example, the user may click a link for a web page associated with the store 202 using a browser on electronic device 110 (or click a link within the web page or another web page) that maps to an application associated with store 202 (e.g., based on a mapping between the URL and an application identifier that has been previously registered, such as with server 120). In other examples, the user may select or otherwise opt to open a link provided from another application running on the electronic device (e.g., a geographical maps application), or provided in a message or an email.

In another example the user may use a camera or other sensor of electronic device 110 to scan a code such as a bar code or a QR code associated with the store, and obtain the uniform resource locator can be obtained by the electronic device based on the scanned code. For example, the electronic device 110 may derive the URL directly from the QR code, or may communicate with local server 120L and/or remote server 120R to obtain the URL based on the code.

In the example of FIG. 2, environment 200 includes a QR code 208 at a point-of-sale 206 of store 202 and a QR code 210 at the entrance 212 of the store 202. QR code 208 and QR code 210 may be the same QR code or may be different QR codes. For example, in one implementation, QR code 208 may be a QR code associated with the point-of-sale 206 that causes the electronic device 110 to obtain a version of the application for store 202 that includes only a payment functionality. QR code 210 may be a QR code associated with the entrance 212 to store 202 that causes the electronic device 110 to obtain a version of the application for store 202 that includes only an online ordering functionality or includes an online ordering functionality and a payment functionality.

In another example, electronic device 110 may communicate with one or more access points such as wireless access point 204 to determine that the electronic device 110 is at or near the location of store 202. Electronic device 110 may communicate with local server 120L associated with store 202 and/or with remote server 120R to determine obtain a network identifier such as a URL for an application associated with store 202 based on the location of electronic device 110 at or near the store.

In one or more implementations, the environment 200 allows for the electronic device 110 to determine its location based on one or more positioning technologies. Examples of such positioning technologies include, but are not limited to, Global Navigation Satellite System (GNSS), wireless access point technology (e.g., based on time of arrival, angle of arrival, and/or signal strength of signals received from wireless access points at known locations), cellular phone signal positioning, Bluetooth signal positioning and/or image recognition positioning. Moreover, the electronic device 110 may implement an inertial navigation system (INS) which uses device sensor(s) (e.g., motion sensors such as accelerometers, gyroscope) to calculate device state (e.g., position, orientation and velocity) for supplementing location data provided by the above-mentioned positioning technologies.

The environment 200 may facilitate providing one or more transient and/or reduced functionality versions of an application for electronic device 110, based on a determination that the location of the electronic device 110 is within the store 202 or within a threshold distance of the store 202. Examples of the store 202 include, but are not limited to, a retail store, a dine-in restaurant, a drive-through restaurant, a showroom, a kiosk, a gas station, a museum, an amusement park, a public park, a tourist landmark, an indoor shopping mall, an outdoor shopping mall, a sports venue, a music venue, or any identifiable location, such as any location that can be geo-fenced.

In the example of FIG. 2, the electronic device 110 is located outside the entrance 212 of the store 202. However, the user may be traveling, for example, by a vehicle (e.g., an automobile, a motorcycle, a bicycle) that is located within a threshold distance of the store 202. For example, if the store 202 is a drive-through restaurant, the user may be traveling by automobile in the drive-through lane, which is at a predetermined position and distance with respect to the physical restaurant.

In addition to contributing to the position solution of the electronic device 110, the wireless access point 204 may also be used to connect the electronic device 110 to a network, such as a local area network, a private network (e.g., an intranet associated with local server 120L), and/or a public network (e.g., the Internet). For example, wireless access point 204 may connect the electronic device 110 to an intranet associated with the store 202 and/or local server 120L for obtaining a URL of an application or a version of an application, in one or more implementations. Alternatively or in addition, one or more of the wireless access points such as wireless access point 204 may connect the electronic device 110 to remote server 120R (e.g., via the Internet).

Various examples are described herein in connection with an application that is associated with a store and/or a retailer. However it should be appreciated that the disclosure applies to any application having a version that is immediately available (e.g., without authentication) on the electronic device 110, such as a transient version of the application and/or a reduced-functionality version of the application.

Figure 3:
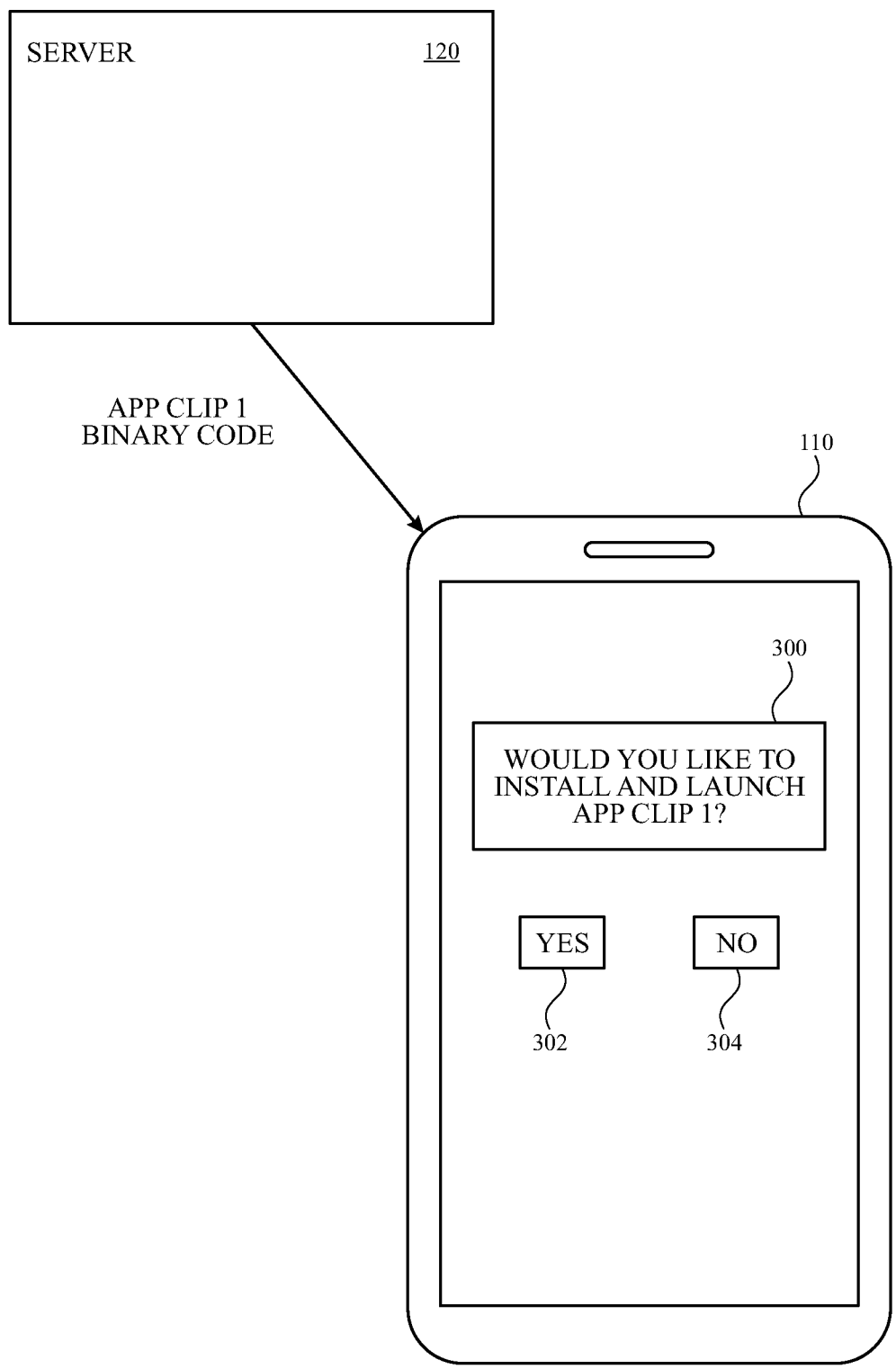
FIG. 3 illustrates an example of an electronic device obtaining a reduced-functionality version of an application in accordance with one or more implementations.

FIG. 3 illustrates an example in which (e.g., in order to provide immediate access to a version of an application that is not installed on electronic device 110), code such as executable code or binary code (e.g., encrypted binary code) for an clip of an application (e.g., a reduced-functionality and/or transient version of the application) can be downloaded to electronic device 110 (e.g., from server 120) while the electronic device 110 prompts the user for authorization to install and launch the application clip (e.g., "App Clip 1").

In the example of FIG. 3, electronic device 110 may have already obtained a URL (e.g., a URL associated with server 120, which can be a local server 120L or a remote server 120R) for an application (e.g., an application associated with a store such as store 202) based on a link to the application (or content associated with the application such as video content associated with a media player application or menu content associated with a restaurant application or a delivery service application), a scanned code, and/or based on the location of the electronic device. In the example of FIG. 3, the electronic device 110 has begun downloading code (e.g., binary or other executable code such as "App Clip 1 Binary Code") while the electronic device 110 provides a request 300 for authorization to install and launch the application clip.

In the example of FIG. 3, request 300 includes text stating "Would you like to install and launch App Clip 1". However, this is merely illustrative and other text and/or graphical information can be used for the request. For example, the request 300 may also include information for the App Clip 1 that was provided to server 120 (e.g., a registration server) in a registration event for App Clip 1, such as a title, a subtitle, and/or an image for App Clip 1. As another example, request 300 may include a request for location confirmation (e.g., a request to access to location information for the device). The request for location confirmation may include, for example, an option to opt out of location sharing for electronic device 110, which may prevent access to the App Clip 1 if selected.

In the example of FIG. 3, the user is provided with a selectable option 302 (e.g., a "YES" button) to authorize the installation and launch of the application clip and a selectable option 304 (e.g., a "NO" button) to decline installation and launch of the application clip. In the example of FIG. 3, the selectable option 302 and the selectable option 304 are virtual buttons provided on a touch screen of electronic device 110, however, this is merely illustrative and the user can provide or decline authorization in various other ways (e.g., with voice input to electronic device 110 and/or using a keypad, a physical button or other input component of electronic device 110). In one or more implementations, request 300 (e.g., and/or another request provided after installation of the application clip) can include a request for permission to provide push notifications with electronic device 110 (e.g., for a period of time after installation or after a last launch of the application clip, such as for a period of hours or a period of days).

In one or more implementations, the push notifications may be location-based notifications. In one or more implementations, request 300 can include a request to allow access to a location of the electronic device (e.g., one time access) and/or to confirm a location of the electronic device (e.g., to confirm a location determined by the electronic device such as using geolocation and/or beacon operations).

For example, a user of electronic device 110 may tap the electronic device 110 against or near a tag at a specific location (e.g., an NFC or RFID tag such as an implementation of wireless access point 204 of store 202) or scan a QR code or other coded identifier associated with a specific location. Responsive to the tap or scan, the electronic device 110 may identify an application clip or other experience (e.g., using a URL obtained via the tap or scan), and provide a request (e.g., as part of the request 300 for authorization and/or as an initial request prior to the request for authorization) to confirm the location of the electronic device 110 (e.g., by providing a check box that allows the user to opt out of location sharing). The request for authorization and/or location sharing may include educational information describing the app clip in one or more implementations.

Once the authorization (e.g., including the authorization to provide location confirmation) is received by the electronic device, app clip may be installed and launched. Before or upon launch, the app clip, may perform a location check (e.g., if location confirmation has been approved). Performing the location check may include obtaining (e.g., from server 120) a region (e.g., known coordinates of the tapped tag or QR code and a radius around the coordinates, proximity to a known Bluetooth beacon, or another geographic description of a region) within which the app clip is permitted to be installed and/or permitted to be run. The known coordinates and the geofence around the known coordinates can be obtained in the bucket of information obtained while the request 300 is displayed or can be obtained in a separate operation. The provided region may include a maximum radius (e.g., two kilometers) and/or minimum radius (e.g., 10 meters) in one or more implementations. Because a full application (e.g., a registered application) can have multiple associated application clips (e.g., associated with different locations and/or different functionalities for the application), different regions (e.g., different sizes such as different radii) can be provided for different tags or QR codes for the same application.

In one or more implementations, responsive to receiving the region from the server (e.g., the coordinates and the radius), the app clip may obtain the device's location, compare the device's location to the receive region, and return a binary response to the server indicating whether electronic device 110 is within the region defined by the server (e.g., whether the device in the expected location corresponding to the tapped tag or scanned code). In response to receiving a response indicating that the electronic device is within the region, the server may provide a key or other information for accessing the application clip and/or server data for running the application clip. In one or more implementations, a rate limit for the app clip can be applied. For example, the application clip can be limited to providing only one location confirmation response per tap or scan of a particular location-associated tag or code.

It should also be appreciated that the location confirmation can be performed on-device (e.g., without providing a binary or other location-based response to the server, for additional privacy purposes). For example, the bucket of information obtained from the server using the hash of a portion of the URL can include the location coordinates for the tapped NFC code or scanned QR code and associated threshold proximity (e.g., geofence) information. The device may then determine whether its current location is within the threshold proximity location coordinates before requesting the key(s), or otherwise communicating with the server.

When electronic device 110 receives authorization for the installation and launch of the app clip (e.g., via a selection of selectable option 302), the code that has been downloaded during the request for authorization can be installed and/or launched by electronic device 110. Installing and launching the downloaded binary code may include requesting, responsive to receiving the authorization, a device-specific key for the downloaded binary code, the key being independent of the user or an account of the user, and installing the downloaded binary code using the key. In one or more implementations, the key can be downloaded prior to receiving the authorization.

In one example use case, a customer at store 202 may carry an electronic device 110, which does not have an application associated with store 202 installed, to point-of-sale 206. Electronic device 110 can, in one or more implementations, detect (e.g., via communication with a GPS system and/or via communication with wireless access point 204) that the electronic device is at or approaching the POS. Electronic device 110 can also, or alternatively, be used to scan a code such as QR code 208 associated with point-of-sale 206. Responsive to the detection of electronic device 110 at or near point-of-sale 206, responsive to the scanning of QR code 208, and/or responsive to selection of a link associated with store 202, electronic device 110 may begin downloading binary code for a transient and/or reduced functionality version, or clip, of the application for store 202 that includes, for example, only a payment functionality of the application. During the download, the electronic device 110 can provide request 300 and selectable options 302 and 304 to the user (e.g., using a touch sensitive display of electronic device 110). Responsive to a selection of selectable option 302, the electronic device can launch the application clip with the payment functionality, and surface a user interface (UI) of the application clip to allow the user to pay for merchandise or services with the application clip.

Later, such as after the user leaves the store 202 with electronic device 110, after a period of time of non-use of the installed application clip, when the user closes the application clip, and/or when the user downloads and installs the full application associated with the application clip and/or the store 202, the code for the application clip can be deleted from electronic device 110 (e.g., without further user interaction such as an explicit request to delete the code). In scenarios in which the code (e.g., the binary code) for the application clip is deleted in connection with an installation of the full application, application data that was generated by the application clip and stored on the electronic device can be maintained for use by the full application. For example, a payment history, payment card information, user preferences, etc. that were stored by the application clip can be stored at a location on electronic device 110 that can later be accessed by the full application after the application clip has been deleted from the electronic device.

It should also be appreciated that, in order to further enhance the immediate access to one or more application clips of an application, code such as binary code and/or executable code for one or more application clips can be pre-loaded onto electronic device in anticipation of the user's potential desire for the application clip. This pre-loading of code for one or more application clips can be performed based on machine-learning of user preferences, and/or crowd-sourced information. For example, a server such as server 120 can determine that many users of many electronic devices are installing and launching an application clip with map functionality for a particular venue (e.g., a museum, a concert venue, a sporting event venue, a theme park, etc.) as the electronic devices approach the venue and/or while the electronic devices are within or near the venue. The server can determine that the electronic device 110 of a new user is within or near the venue, and provide, responsively, the code for the same application with the map functionality to the electronic device 110 of the new user, even before the user arrives at the venue or is presented with a request (e.g., a request 300) for authorization to install and launch the application clip. The request for authorization can be provided by electronic device 110 when the code has been downloaded, or later when the user scans a code at the venue or inputs information indicating that a mapping functionality is desired (e.g., inputs a search request associated with the venue or a location within the venue, such as using a search application that is installed on the device but is not a spatial or geographical mapping application and does not have spatial or geographical mapping capability), in this example.

Although FIG. 3 depicts an example in which user authorization is requested prior to installing and launching the application clip, in other scenarios, the application clip can be installed and launched without a specific authorization request (e.g., and without authentication). For example, in one or more implementations, the application clip can be downloaded, installed, and launched when a QR code, such as QR code 208 or QR code 210, is read by electronic device 110 (e.g., instead of when the user provides authorization such as by clicking to "install" or "open" the application clip). For example, the QR code may, when read by electronic device 110, may cause electronic device 110 to perform a deep link and install (e.g., and launch) operation as a single action. For example, scanning the QR code can cause the reduced functionality version of the application to automatically download, install, and launch a user interface with content corresponding to the scanned QR code. In one or more implementations, the user interface can be display so as to appear to float over previously displayed content on the display of the electronic device.

Figure 4:
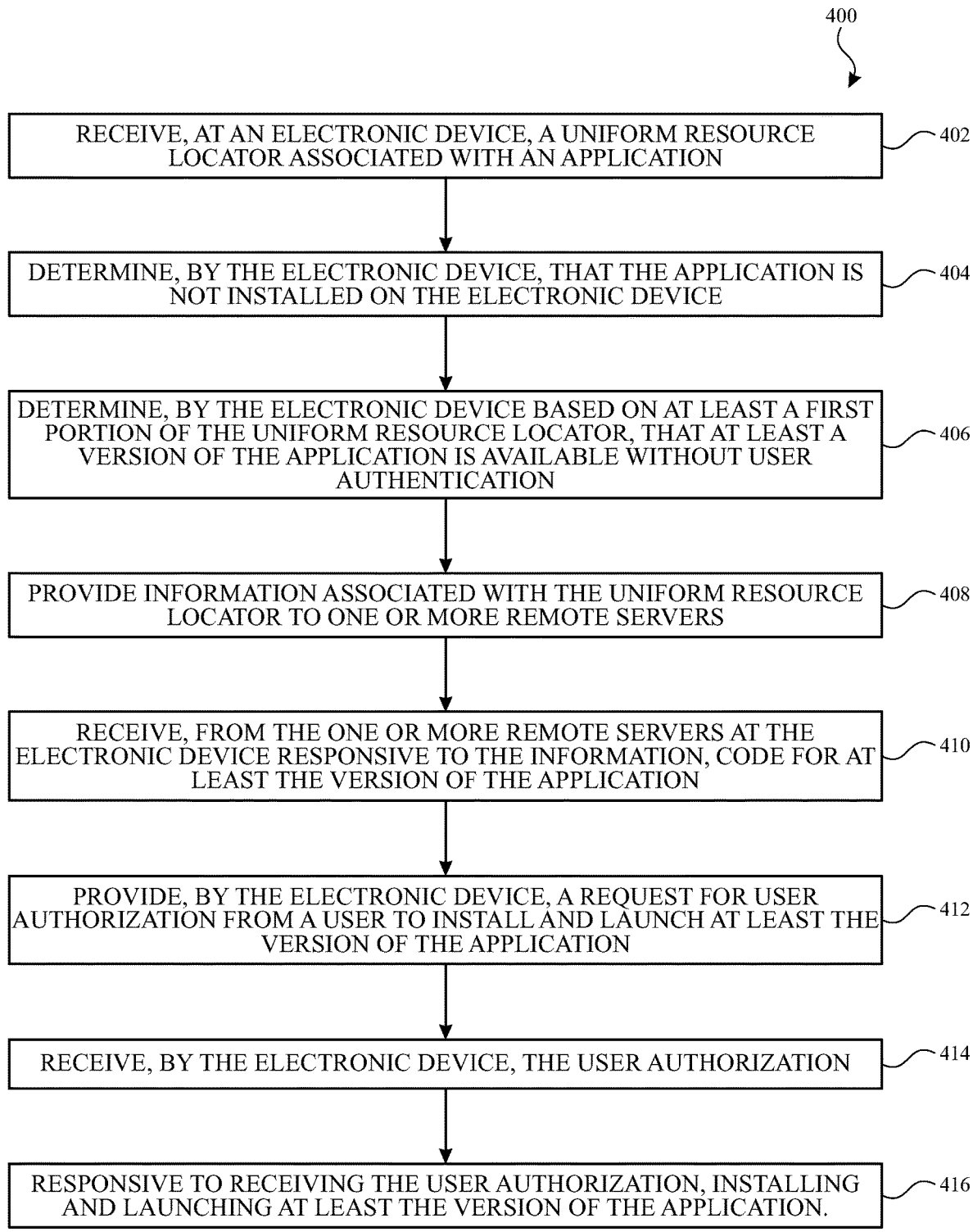
FIG. 4 illustrates a flow diagram of an example process for providing a reduced-functionality version of an application in accordance with one or more implementations.

FIG. 4 illustrates a flow diagram of an example process for providing a version of an application on an electronic device in accordance with one or more implementations. For explanatory purposes, the process 400 is primarily described herein with reference to the electronic device 110 and server 120 of FIG. 1. However, the process 400 is not limited to the electronic device 110 and server 120 of FIG. 1, and one or more blocks (or operations) of the process 400 may be performed by one or more other components of the server 120 or the electronic device 110 and/or by other suitable devices such as electronic device 115. Further for explanatory purposes, the blocks of the process 400 are described herein as occurring in series, or linearly. However, multiple blocks of the process 400 may occur in parallel. In addition, the blocks of the process 400 need not be performed in the order shown and/or one or more blocks of the process 400 need not be performed and/or can be replaced by other operations.

At block 402, an electronic device such as electronic device 110 receives a uniform resource locator (URL) associated with an application (e.g., a full application or a full version of the application. The application, when installed on an electronic device, can provide multiple functionalities for the electronic device. Receiving the uniform resource locator may include scanning, by the electronic device, a QR code. Receiving the uniform resource locator may include receiving a selection of a link (e.g., a link provided by another application running on the electronic device). Receiving the uniform resource locator may include receiving the uniform resource locator based on a location of the electronic device (e.g., as described above in connection with FIG. 2).

At block 404, the electronic device determines that the application is not installed on the electronic device.

At block 406, the electronic device determines, based on at least a first portion of the uniform resource locator, that at least a version of the application is available without user authentication. The version of the application may be a reduced-functionality version of the application that has less functionality than a full version of the application. The version of the application may be a transient version of the application that has less functionality than a full version of the application. The version of the application may be referred to herein as an application clip or an app clip. Determining that the version of the application is available may include providing the URL or a hash of the URL to a Bloom filter at the electronic device and/or providing a portion of the hash of the URL or a hash of a portion of the URL to one or more remote servers such as server 120 (e.g., a registration server as described above in connection with FIGS. 2 and 3).

At block 408, the electronic device may provide information associated with the uniform resource locator to one or more remote servers such as server 120. The information associated with the uniform resource locator may include an identifier of at least the version of the application (e.g., an identifier of the application and/or one or more identifiers of one or more reduced-functionality or transient versions of the application). The information associated with the uniform resource locator may be obtained from the one or more remote servers, in a privacy preserving operation, responsive to providing the portion of the hash of the URL or the hash of the portion of the URL to the one or more remote servers.

At block 410, the electronic device may receive, from the one or more remote servers (e.g., from the same server that provided the information associated with the URL or from another server such as an application server) and responsive to the information, code for at least the version of the application. The code for the version of the application may be smaller than code for the full application. For example, to help reduce the time to download, install, and launch the version of the application, the code for the version of the application may be, for example, less than ten megabytes, less than twenty megabytes, less than fifty megabytes, less than one hundred megabytes, or any size that is smaller than the code for the full application. In one or more implementations, the code includes binary code for the version of the application. In one or more implementations, the code may be encrypted binary code (e.g., digital rights management (DRM) encrypted binary code).

At block 412, the electronic device may provide a request (e.g., a request 300 as shown in FIG. 3) for user authorization from a user to install and launch at least the version of the application. In one or more implementations, the request for user authorization at block 412 is provided during the receiving of the code at block 410.

At block 414, the electronic device may receive the user authorization (e.g., via a selection of a selectable option 302 to authorize the installation and launch). In one or more implementations, the user authorization is received without receiving user authentication. User authentication may include providing identifying information for the user and/or security information for the user (e.g., a passcode) that is associated with an account of the user with a remote server such as server 120. User authorization may be a permission that is provided independent of information associated with any particular user.

At block 416, responsive to receiving the user authorization, the electronic device may install and launch at least the version of the application. In one or more implementations, installing and launching the version of the application may include requesting, responsive to receiving the user authorization, a key for the binary code from the one or more remote servers; receiving, responsive to the requesting, the key; and installing and launching at least the version of the application using the key. In implementations in which the binary code is encrypted binary code such as DRM encrypted binary code, the key may be a device-specific decryption key that is unrelated to the user.

In one or more implementations, the electronic device 110 may also limit the rate and/or amount of data usage by the version of the application. For example, the electronic device 110 may monitor data usage by at least the version of the application for a predetermined amount of time (e.g., one minute, several minutes, less than one minute) after launching the at least the version of the application; and terminate operation of at least the version of the application if the data usage exceeds a predetermined rate during the predetermined amount of time. As another example, in one or more implementations, electronic device 110 can limit the usage of the version of the application based on the user's location (e.g., when the user leaves store 202, usage of and/or access to a version of the application can be prevented or limited).

In one or more implementations, the electronic device may also, based on a location of the electronic device 110 and/or crowd-sourced information from other electronic devices associated with the location, pre-load at least one reduced-functionality version of at least one application from the one or more remote servers to the electronic device (e.g., in anticipation of the user needing or desiring one or more sub-functionalities of one or more applications).

In one or more implementations, the code for the version of the application can be deleted automatically, and without user input, after the user has completed use of the version of the application. For example, electronic device 110 may identify a period of non-use of the version of the application exceeding a threshold period (e.g., a period of one hour, one day, one week, ten days, or one month); and deleting the code for the version of the application from the electronic device. Deleting the code may include deleting the code automatically responsive to the period of non-use exceeding the threshold period, and without user interaction.

In one or more implementations, the code for the version of the application can be deleted when the full application corresponding to the version of the application is installed, so that a transient and/or reduced-functionality version of the application is replaced by the full application. In one or more implementations, the full application can be obtained responsive to a selection of an option to do so that is provided within the version of the application.

Figure 5:
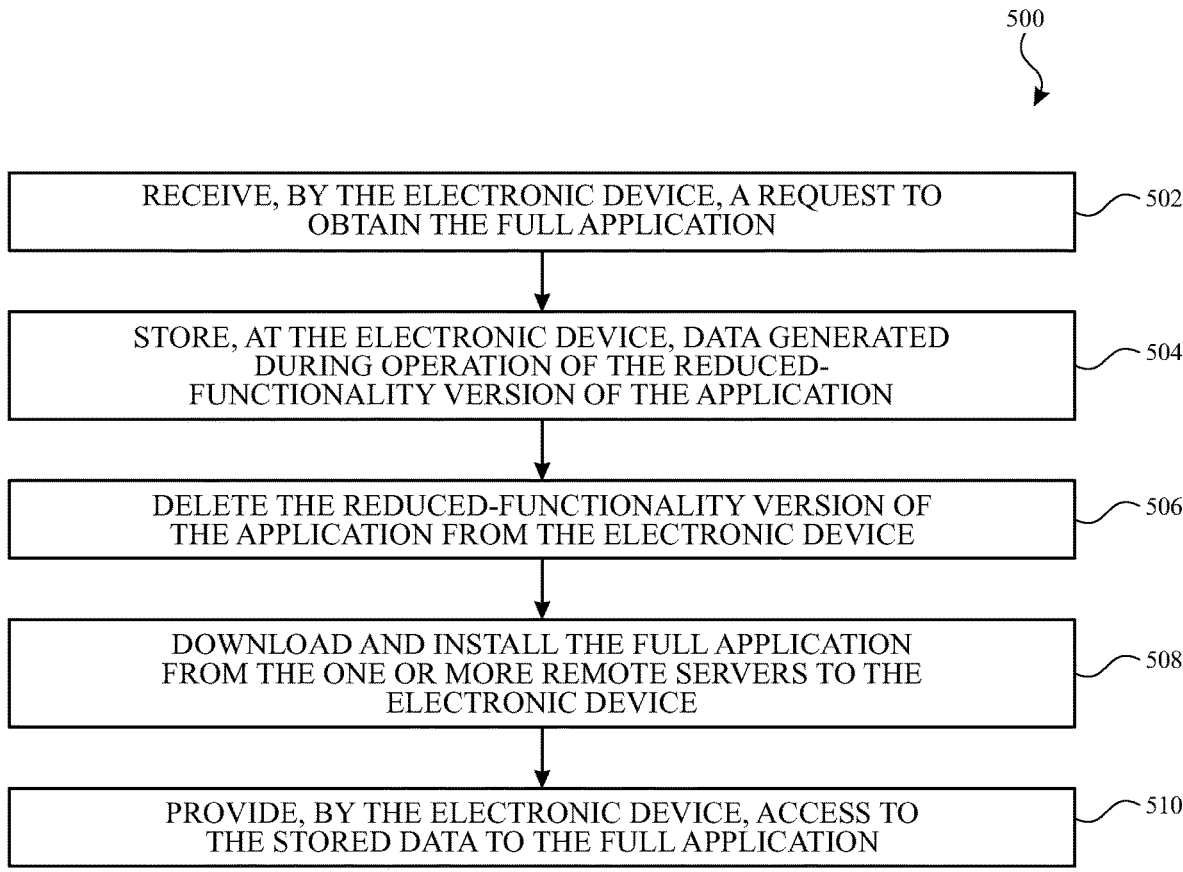
FIG. 5 illustrates a flow diagram of an example process for replacing a reduced-functionality version of an application with the full version of the application in accordance with one or more implementations.

FIG. 5 illustrates a flow diagram of an example process for replacing a version of an application (e.g., an application clip or a reduced-functionality version or transient version of an application) with a full application (e.g., a full version of the application) in accordance with one or more implementations. For explanatory purposes, the process 500 is primarily described herein with reference to the electronic device 110 and server 120 of FIG. 1. However, the process 500 is not limited to the electronic device 110 and server 120 of FIG. 1, and one or more blocks (or operations) of the process 500 may be performed by one or more other components of the server 120 or the electronic device 110 and/or by other suitable devices such as electronic device 115. Further for explanatory purposes, the blocks of the process 500 are described herein as occurring in series, or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, an electronic device such as electronic device 110 receives a request to obtain the full application (e.g., a full application corresponding to an application clip that has been installed on the electronic device). The electronic device 110 can receive the request to obtain the full application when the user launches an additional application for accessing a remote application store or repository (e.g., at server 120), locates the full application in the application store; and selects the full application for download and installation.

At block 504, the electronic device stores data generated during operation of the reduced-functionality version of the application (e.g., locally at the electronic device or in cloud storage such as storage at a remote server such as server 120). The stored data may include user activity data, purchase history data, location history data, messaging history data, calendar data, and/or any other data generated by the reduced-functionality version of the application. Access to the stored data generated by the reduced-functionality version, by applications other than the full application, can be prevented. In one or more implementations, user authentication information (e.g., for authentication with server 120) can be provided via the reduced-functionality version of the application, after the reduced-functionality version of the application has been installed on the electronic device (e.g., to enhance the performance of the reduced-functionality version of the application such as by allowing longer or remote storage of the data generated by the reduced-functionality version of the application, and/or access to other user data stored at the remote server 120 or on the electronic device 110 in association with an account of the user).

At block 506, the electronic device deletes the reduced-functionality version of the application from the electronic device. The electronic device may delete the reduced-functionality version of the application without receiving user input explicitly requesting or instructing the deletion.

At block 508, the electronic device downloads and installs the full application from the one or more remote servers to the electronic device. In one or more implementations, the electronic device requests authentication information for a user account of the user for receiving the full application, prior to downloading and/or installing the full application. The request for the authentication information may be generated by the additional application for accessing the remote application store. The request for the authentication information can be provided when the additional application is launched and/or when the request to obtain the full application is received. The additional application may authenticate the user locally at the electronic device using the received authentication information, or the additional application can provide the authentication information or information associated with the authentication information to the remote server hosting the application store for authentication of the user.

At block 510, the electronic device provides access, by the full application, to the stored data. The full application can then provide user-specific functionality for the user, based on the stored data, even without the full application ever having been used by the user.

In one or more implementations, the electronic device can also generate an icon for the full application that is selectable by the user to launch the full application. The version of the application can be provided for use by the user without providing an associated selectable icon (e.g., the at least the reduced-functionality version of the application does not have an associated selectable icon). The icon can be provided on, for example, a home screen on the electronic device. The icon can be created at the electronic device or can be obtained from the remote server 120.

Figure 6:
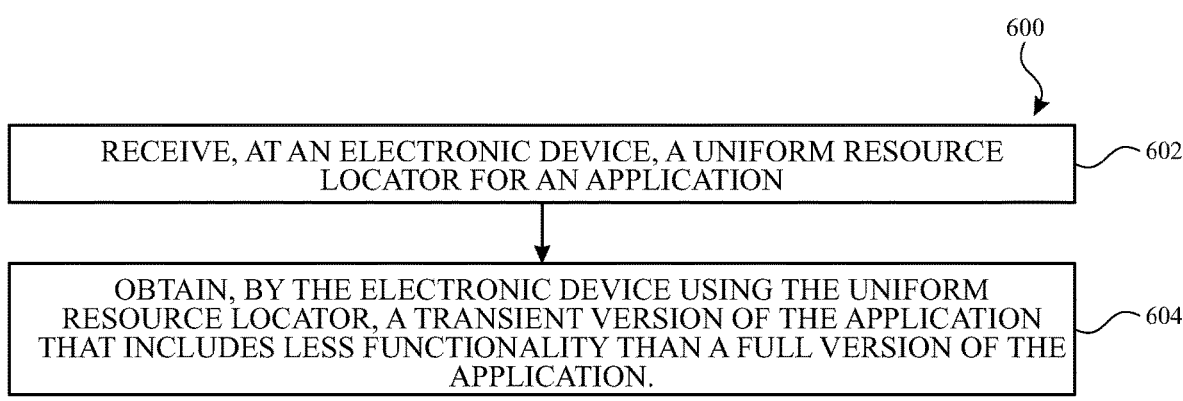
FIG. 6 illustrates a flow diagram of an example process for providing a transient version of an application in accordance with one or more implementations.

FIG. 6 illustrates a flow diagram of an example process for providing a transient version of an application on an electronic device in accordance with one or more implementations. For explanatory purposes, the process 600 is primarily described herein with reference to the electronic device 110 and server 120 of FIG. 1. However, the process 600 is not limited to the electronic device 110 and server 120 of FIG. 1, and one or more blocks (or operations) of the process 600 may be performed by one or more other components of the server 120 or the electronic device 110 and/or by other suitable devices such as electronic device 115. Further for explanatory purposes, the blocks of the process 600 are described herein as occurring in series, or linearly. However, multiple blocks of the process 600 may occur in parallel. In addition, the blocks of the process 600 need not be performed in the order shown and/or one or more blocks of the process 600 need not be performed and/or can be replaced by other operations.

At block 602, an electronic device such as electronic device 110 receives a uniform resource locator for an application. Receiving the uniform resource locator may include scanning, by the electronic device, a QR code. Receiving the uniform resource locator may include receiving a selection of a link (e.g., a link provided by another application running on the electronic device). Receiving the uniform resource locator may include receiving the uniform resource locator based on a location of the electronic device (e.g., as described above in connection with FIG. 2). The transient version of the application may be referred to herein as an application clip or an app clip.

At block 604, using the uniform resource locator, the electronic device receives a transient version of the application that includes less functionality than a full version of the application. The electronic device may also, prior to obtaining the transient version of the application, receive authorization from a user of the electronic device to obtain the transient version of the application. The authorization from the user may be received responsive to a request for authorization provided by the electronic device as described above in connection with the example of FIG. 3.

In one or more implementations, the authorization from the user is received without authentication of the user. In one or more implementations, the electronic device determines that the full version of the application is not installed on the electronic device prior to receiving the transient version of the application. In one or more implementations, the electronic device determines (e.g., using a Bloom filter at the electronic device) that the URL is associated with an application identifier, and determines (e.g., by providing a hash of a portion of the URL or a portion of a hash of the URL to a server and locally sorting information received from the server responsive to the hash of a portion of the URL or the portion of the hash of the URL) that the transient version of the application is available.

In one or more implementations, the electronic device may also receive authenticating information for the user at the electronic device. The electronic device may obtain the full version of the application using the authenticating information, delete the transient version of the application from the electronic device, and install the full version of the application on the electronic device. The electronic device may also provide, to the installed full version of the application, access to data that was generated by the transient version of the application prior to deletion of the transient version of the application (e.g., as described above in connection with FIG. 5).

Various examples are described herein for obtaining an application clip (e.g., a transient version of an application having reduced functionality relative to the full application). However, it should be appreciated that the operations for obtaining, installing, and launching the application clips described herein can be applied to obtain any suitable application or other experience that can be provided by an electronic device. For example, code such as binary or executable code can be stored at a server (e.g., server 120) in connection registration information for that application or experience. The registration information may include a network identifier such as a URL as described herein, and information for display in an authorization request, such as a title, a subtitle, an image or the like.

Figure 7:
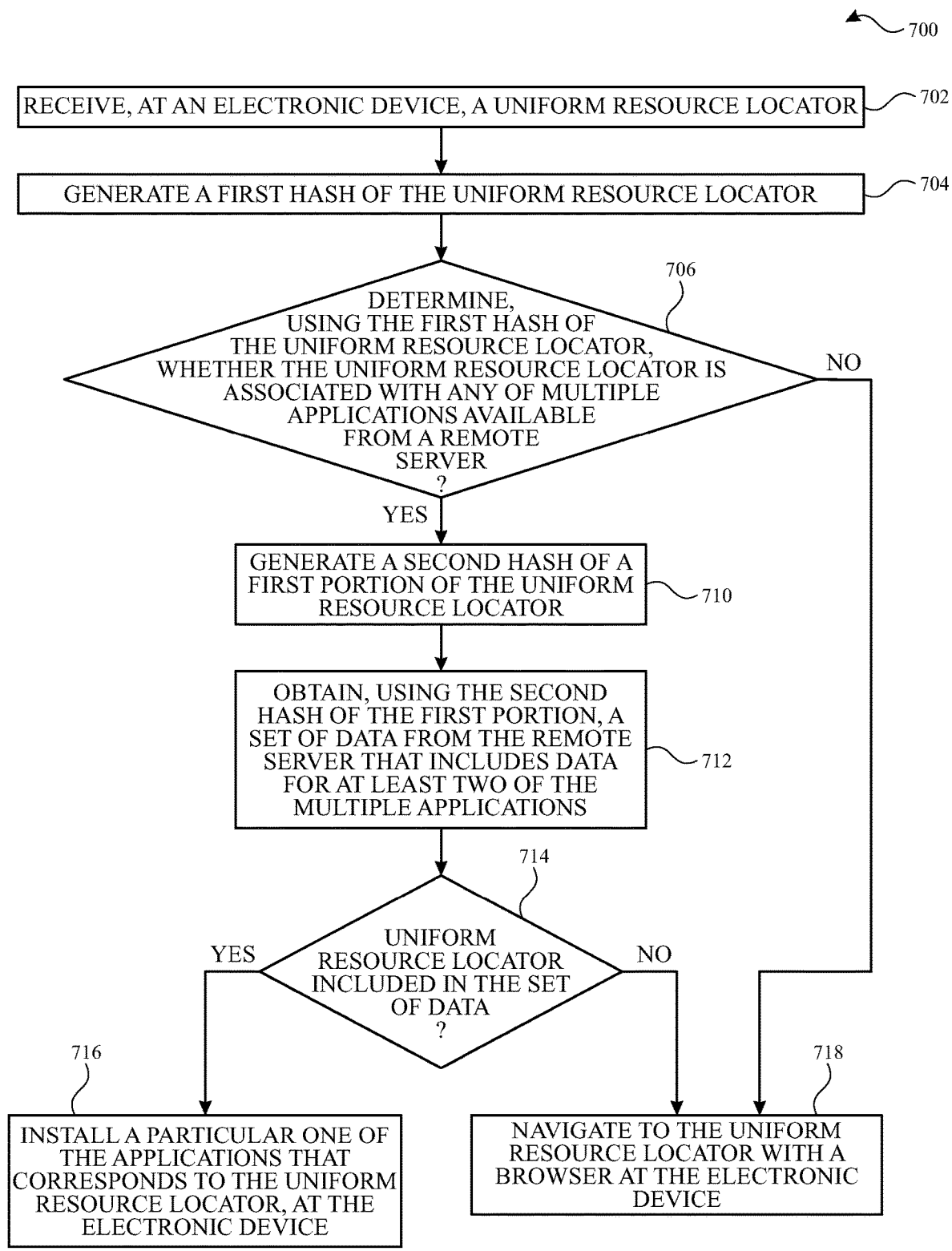
FIG. 7 illustrates a flow diagram of an example process for obtaining a registered application in accordance with one or more implementations.

FIG. 7 illustrates a flow diagram of an example process for obtaining a registered application for an electronic device, such as for obtaining an experience, registered with a remote server, to be provided by the electronic device in accordance with one or more implementations. For explanatory purposes, the process 700 is primarily described herein with reference to the electronic device 110 and server 120 of FIG. 1. However, the process 700 is not limited to the electronic device 110 and server 120 of FIG. 1, and one or more blocks (or operations) of the process 700 may be performed by one or more other components of the server 120 or the electronic device 110 and/or by other suitable devices such as electronic device 115. Further for explanatory purposes, the blocks of the process 700 are described herein as occurring in series, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, an electronic device may receive a uniform resource locator (URL). Receiving the uniform resource locator may include scanning, by the electronic device, a code such as a QR code or a code embedded in another visual medium such as an image that does not appear to the human eye to include a code, or a code transmitted and/or broadcasted wirelessly, such as via NFC or Bluetooth, for example. The code may, for example, be an encoded arrangement of colors, shapes, and/or other features of an image. Receiving the uniform resource locator may include receiving a selection of a link (e.g., a link provided by another application running on the electronic device, such as a map application or a browser application). Receiving the uniform resource locator may include receiving the uniform resource locator based on a location of the electronic device (e.g., via NFC or other location-based communications with the electronic device, such as described above in connection with FIG. 2).

At block 704, the electronic device may generate a first hash of the uniform resource locator. The first hash of the URL may be a hash of the entire URL.

At block 706, the electronic device may determine, using the first hash of the uniform resource locator, whether the uniform resource locator is associated with any of multiple applications available from one or more remote servers (e.g., from an application server). Determining, using the first hash of the uniform resource locator, whether the uniform resource locator is associated with any of the multiple applications available from the one or more remote servers may include providing the first hash of the uniform resource locator to a Bloom filter. The Bloom filter may be pre-stored at the electronic device, or may be obtained from a remote server (e.g., server 120) when the uniform resource locator is obtained.

In response to a determination that the uniform resource locator is (e.g., "Yes") associated with any of the applications at block 706, at block 710 the electronic device may generate a second hash of a first portion of the uniform resource locator. The first portion of the uniform resource locator may be, for example, a prefix of the uniform resource locator. At block 712, the electronic device may obtain, using the second hash of the first portion, a set of data from the one or more remote servers (e.g., the same remote server or another remote server such as a registration server) that includes data (e.g., a set of information or a bucket of information) for at least two of the applications. At block 714, the electronic device may determine whether the uniform resource locator is included in the set of data. At block 716, in response to a determination at block 714 that the uniform resource locator is (e.g., "Yes") included in the set of data, the electronic device may install a particular one of the applications that corresponds to the uniform resource locator, at the electronic device. Installing the particular one of the applications that corresponds to the uniform resource locator, at the electronic device, may include installing the data in the set of data for the particular one of the applications or may include downloading and installing additional data for the particular one of the applications (e.g., downloading and installing metadata and/or binary code for the particular one of the applications from another remote server such as from an application server).

In response to a determination at block 714 that the uniform resource locator is not (e.g., "No") included in the set of data or a determination at block 706 that the uniform resource locator is not (e.g., "No") associated with any of the applications, the electronic device may navigate, at block 718, to the uniform resource locator with a browser at the electronic device.

In one or more implementations, in response to a determination (at block 706, such as using the Bloom filter) that the uniform resource locator is not associated with any of the applications, and prior to navigating to the uniform resource locator with the browser at the electronic device at block 718, the electronic device may generate a third hash of a truncation of the uniform resource locator (e.g., by removing path or query component suffixes from the URL to generate a hash of a prefix of the URL), provide the third hash to the Bloom filter, and determine whether the uniform resource locator is associated with any of the applications using the Bloom filter and the third hash of the prefix of the URL (e.g., by determining, based on providing the third hash to the Bloom filter, whether the third hash is associated with any of the plurality of applications). The electronic device may be configured to perform one or more successive path or query component suffix removals, and filters of the URL, before determining, at block 706, that the uniform resource locator is not associated with any of the applications.

In one or more implementations, in response to a determination (at block 714) that the uniform resource locator is not included in the set of data, and prior to navigating to the uniform resource locator with the browser at the electronic device at block 718, the electronic device may generate a third hash of a subset of the first portion of the uniform resource locator (e.g., by removing path or query component suffixes from the URL to generate a hash of a prefix of the URL), obtain a second set of data from the one or more remote servers for at least two of the applications using the third hash of the subset of the first portion, and determine whether the uniform resource locator is included in the second set of data. The electronic device may be configured to perform one or more successive path or query component suffix removals before determining, at block 714, that the uniform resource locator is not included in the second set of data. In response to a determination that the uniform resource locator is included in the second set of data (or in the first set of data), the electronic device may install the particular one of the applications that corresponds to the uniform resource locator, at the electronic device (e.g., at block 716). In this way, false negatives due to additional information in the URL (e.g., arguments, parameters, etc.) can be avoided.

In one or more implementations, the uniform resource locator may include a hypertext transfer protocol (HTTP) address that includes an address of the remote server (e.g., "codes.server.com"), an identifier of the particular one of the applications (e.g., "experienceID"), and one or more arguments (e.g., {arguments}) associated with the particular one of the applications. The electronic device may identify the particular one of the applications that corresponds to the uniform resource locator (e.g., at block 714) using the identifier in the uniform resource locator. The electronic device may also launch the particular one of the applications, in part, by providing at least one of the one or more arguments in the uniform resource locator to the particular one of the applications.

The present disclosure recognizes that the use of such personal information data, in the present technology, can be used to the benefit of users. For example, the personal information data can be used for providing application clips to a user's electronic device based on a user's location, a user's preferences, a user's activity, and/or crowd-sourced information for the user or other users.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing application clips, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

In one or more implementations, application clips can be accessible for an application that is installed on the electronic device. For example, based on a location of the electronic device, a scan of a code by the electronic device, and/or a power level of the electronic device, a an application clip having only a subset of the functionality of the installed application can be launched.

Figure 8:
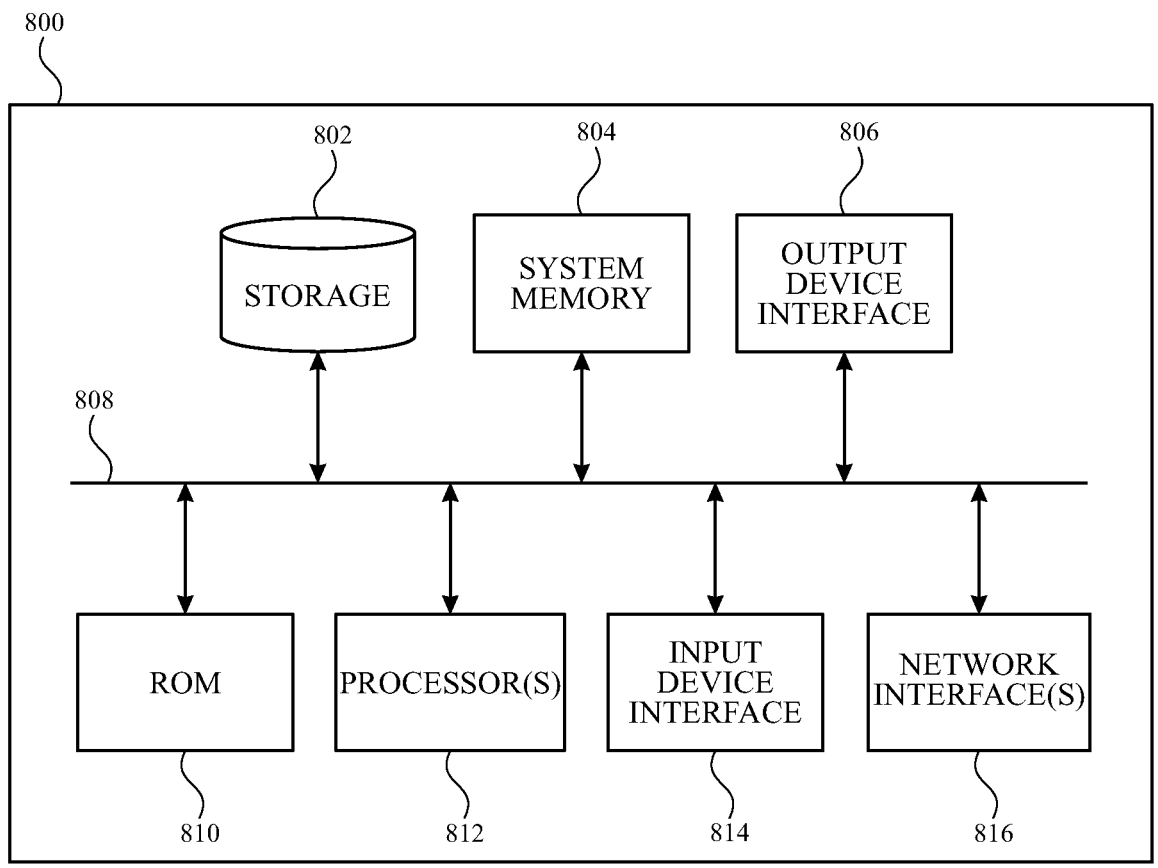
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, the electronic device 110, and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 110 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

In accordance with aspects of the disclosure, a method is provided that includes receiving, at an electronic device, a uniform resource locator associated with an application; determining, by the electronic device, that the application is not installed on the electronic device; determining, by the electronic device based on at least a first portion of the uniform resource locator, that at least a version of the application is available without user authentication; providing information associated with the uniform resource locator to one or more remote servers; receiving, from the one or more remote servers at the electronic device responsive to the information, code for at least the version of the application; providing, by the electronic device, a request for user authorization from a user to install and launch at least the version of the application; receiving, by the electronic device, the user authorization; and responsive to receiving the user authorization, installing and launching at least the version of the application.

In accordance with aspects of the disclosure, a method is provided that includes receiving, at an electronic device, a uniform resource locator for an application; and obtaining, by the electronic device using the uniform resource locator, a transient version of the application that includes less functionality than a full version of the application.

In accordance with aspects of the disclosure, a non-transitory machine-readable medium is provided that includes code that, when executed by a processor, causes the processor to: receive, at an electronic device, a uniform resource locator associated with an application; determine, by the electronic device, that the application is not installed on the electronic device; determine, by the electronic device based on at least a first portion of the uniform resource locator, that at least a version of the application is available without user authentication; provide information associated with the uniform resource locator to one or more remote servers; receive, from the one or more remote servers at the electronic device responsive to the information, code for at least the version of the application; provide, by the electronic device, a request for user authorization from a user to install and launch at least the version of the application; receive, by the electronic device, the user authorization; and responsive to receiving the user authorization, install and launch at least the version of the application.

In accordance with aspects of the disclosure, a device is provided that includes memory, and at least one processor configured to receive, at an electronic device, a uniform resource locator associated with an application; determine, by the electronic device, that the application is not installed on the electronic device; determine, by the electronic device based on at least a first portion of the uniform resource locator, that at least a version of the application is available without user authentication; provide information associated with the uniform resource locator to one or more remote servers; receive, from the one or more remote servers at the electronic device responsive to the information, code for at least the version of the application; provide, by the electronic device, a request for user authorization from a user to install and launch at least the version of the application; receive, by the electronic device, the user authorization; and responsive to receiving the user authorization, install and launch at least the version of the application.

In accordance with aspects of the disclosure, non-transitory computer-readable medium is provided storing instructions that, when executed by one or more processors, cause the one or more processors to perform operations including receiving, at an electronic device, a uniform resource locator; generating a first hash of the uniform resource locator; determining, using the first hash of the uniform resource locator, whether the uniform resource locator is associated with any of a plurality of applications available from a remote server; in response to a determination that the uniform resource locator is associated with any of the plurality of applications: generating a second hash of a first portion of the uniform resource locator; obtaining, using the second hash of the first portion, a set of data from the remote server that includes data for at least two of the plurality of applications; determining whether the uniform resource locator is included in the set of data; and in response to a determination that the uniform resource locator is included in the set of data, installing a particular one of the applications that corresponds to the uniform resource locator, at the electronic device; and in response to a determination that the uniform resource locator is not included in the set of data, navigating to the uniform resource locator with a browser at the electronic device; and in response to a determination that the uniform resource locator is not associated with any of the plurality of applications, navigating to the uniform resource locator with the browser at the electronic device.

In accordance with aspects of the disclosure, a method is provided that includes receiving, at an electronic device, a uniform resource locator; generating a first hash of the uniform resource locator; determining, using the first hash of the uniform resource locator, whether the uniform resource locator is associated with any of a plurality of applications available from a remote server; in response to a determination that the uniform resource locator is associated with any of the plurality of applications: generating a second hash of a first portion of the uniform resource locator; obtaining, using the second hash of the first portion, a set of data from the remote server that includes data for at least two of the plurality of applications; determining whether the uniform resource locator is included in the set of data; and in response to a determination that the uniform resource locator is included in the set of data, installing a particular one of the applications that corresponds to the uniform resource locator, at the electronic device; and in response to a determination that the uniform resource locator is not included in the set of data, navigating to the uniform resource locator with a browser at the electronic device; and in response to a determination that the uniform resource locator is not associated with any of the plurality of applications, navigating to the uniform resource locator with the browser at the electronic device.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
  receiving, at an electronic device, a uniform resource locator associated with an application;
  determining, by the electronic device, that the application is not installed on the electronic device;
  determining, locally at the electronic device based on at least a first portion of the uniform resource locator, that at least a version of the application is available without user authentication;
  responsive to the determining that the at least the version of the application is available, providing information associated with the uniform resource locator to one or more remote servers;
  receiving, from the one or more remote servers at the electronic device responsive to the information, code for at least the version of the application;
  providing, by the electronic device, a request for user authorization from a user to install and launch at least the version of the application; and
  responsive to receiving the user authorization, installing and launching at least the version of the application.

2. The method of claim 1, wherein the version of the application is a reduced-functionality version of the application that has less functionality than a full version of the application.

3. The method of claim 1, wherein the request for user authorization is provided during the receiving of the code.

4. The method of claim 3, wherein the code comprises binary code for the version of the application, and wherein the method further comprises:
  requesting, responsive to receiving the user authorization, a key for the binary code from the one or more remote servers;
  receiving, responsive to the requesting, the key; and
  installing and launching at least the version of the application using the key.

5. The method of claim 1, wherein the code for the version of the application is less than ten megabytes.

6. The method of claim 1, further comprising:
  monitoring data usage by at least the version of the application for a predetermined amount of time after launching the at least the version of the application; and
  terminating operation of at least the version of the application if the data usage exceeds a predetermined rate during the predetermined amount of time.

7. The method of claim 1, wherein the version of the application is a reduced-functionality version of a full application, the method further comprising:
  receiving, by the electronic device, a request to obtain the full application;
  storing, at the electronic device, data generated during operation of the reduced-functionality version of the application;
  deleting the reduced-functionality version of the application from the electronic device;
  downloading and installing the full application from the one or more remote servers to the electronic device; and
  providing, by the electronic device, access to the stored data to the full application.

8. The method of claim 7, further comprising requesting, by the electronic device, authentication information for a user account of the user for receiving the full application, prior to downloading and installing the full application.

9. The method of claim 7, further comprising generating an icon for the full application that is selectable by the user to launch the full application, wherein the at least the reduced-functionality version of the application does not have an associated selectable icon.

10. The method of claim 1, wherein receiving the uniform resource locator comprises scanning, by the electronic device, a QR code.

11. The method of claim 1, wherein receiving the uniform resource locator comprises receiving a selection of a link.

12. The method of claim 1, wherein receiving the uniform resource locator comprises receiving the uniform resource locator based on a location of the electronic device.

13. The method of claim 1, further comprising:
identifying, by the electronic device, a period of non-use of the version of the application exceeding a threshold period; and
deleting the code for the version of the application from the electronic device.

14. The method of claim 13, wherein deleting the code comprises deleting the code automatically responsive to the period of non-use exceeding the threshold period, and without user interaction.

15. The method of claim 1, further comprising, based on a location of the electronic device and crowd-sourced information from other electronic devices associated with the location, pre-loading at least one reduced-functionality version of at least one application from the one or more remote servers to the electronic device.

16. The method of claim 1, wherein the user authorization is received without receiving user authentication information.

17. A method, comprising:
receiving, at an electronic device, a uniform resource locator for an application;
obtaining, by the electronic device using the uniform resource locator, a transient version of the application that includes less functionality than a full version of the application;
receiving authenticating information for a user at the electronic device;
obtaining the full version of the application by the electronic device using the authenticating information;
responsive to obtaining the full version of the application, deleting the transient version of the application from the electronic device;
installing the full version of the application on the electronic device; and
providing, to the installed full version of the application, access to data that was generated by the transient version of the application prior to deletion of the transient version of the application.

18. The method of claim 17, further comprising, prior to obtaining the transient version of the application, receiving authorization from a user of the electronic device to obtain the transient version of the application.

19. The method of claim 18, wherein the authorization from the user is received without authentication of the user.

20. A non-transitory machine-readable medium comprising code that, when executed by a processor, causes the processor to:
receive, at an electronic device, a uniform resource locator associated with an application;
determine, by the electronic device, that the application is not installed on the electronic device;
determine, by the electronic device based on at least a first portion of the uniform resource locator, that at least a version of the application is available without user authentication;
provide information associated with the uniform resource locator to one or more remote servers;
receive, from the one or more remote servers at the electronic device responsive to the information, code for at least the version of the application;
provide, by the electronic device, a request for user authorization from a user to install and launch at least the version of the application;
receive, by the electronic device, the user authorization; and
responsive to receiving the user authorization, install and launch at least the version of the application.

21. A non-transitory computer-readable medium storing instructions that, when executed by one or more processors, cause the one or more processors to perform operations comprising:
receiving, at an electronic device, a uniform resource locator;
generating a first hash of the uniform resource locator;
determining, using the first hash of the uniform resource locator, whether the uniform resource locator is associated with any of a plurality of applications available from one or more remote servers;
in response to a determination that the uniform resource locator is associated with any of the plurality of applications:
generating a second hash of a first portion of the uniform resource locator;
obtaining, using the second hash of the first portion, a set of data from the one or more remote servers that includes data for at least two of the plurality of applications;
determining whether the uniform resource locator is included in the set of data; and
in response to a determination that the uniform resource locator is included in the set of data, installing a particular one of the applications that corresponds to the uniform resource locator, at the electronic device; and
in response to a determination that the uniform resource locator is not included in the set of data, navigating to the uniform resource locator with a browser at the electronic device; and
in response to a determination that the uniform resource locator is not associated with any of the plurality of applications, navigating to the uniform resource locator with the browser at the electronic device.

22. The non-transitory computer-readable medium of claim 21, wherein the first portion of the uniform resource locator comprises a prefix of the uniform resource locator.

23. The non-transitory computer-readable medium of claim 21, wherein determining, using the first hash of the uniform resource locator, whether the uniform resource locator is associated with any of the plurality of applications available from the one or more remote servers comprises providing the first hash of the uniform resource locator to a Bloom filter.

24. The non-transitory computer-readable medium of claim 23, the operations further comprising, in response to a determination that the first hash of the uniform resource locator is not associated with any of the plurality of applications using the Bloom filter, and prior to navigating to the uniform resource locator with the browser at the electronic device:
generating a third hash of a truncation of the uniform resource locator; and
determining, based on providing the third hash to the Bloom filter, whether the third hash is associated with any of the plurality of applications.

25. The non-transitory computer-readable medium of claim 21, the operations further comprising, in response to a determination that the uniform resource locator is not included in the set of data, and prior to navigating to the uniform resource locator with the browser at the electronic device:

generating a third hash of a subset of the first portion of the uniform resource locator;

obtaining a second set of data from the one or more remote servers for at least two of the plurality of applications using the third hash of the subset of the first portion; and determining whether the uniform resource locator is included in the second set of data.

26. The non-transitory computer-readable medium of claim 25, the operations further comprising:

in response to a determination that the uniform resource locator is included in the second set of data, installing the particular one of the applications that corresponds to the uniform resource locator, at the electronic device.

27. The non-transitory computer-readable medium of claim 21, wherein the uniform resource locator comprises a hypertext transfer protocol address that includes an address of the one or more remote servers, an identifier of the particular one of the applications, and one or more arguments associated with the particular one of the plurality of applications.

28. The non-transitory computer-readable medium of claim 27, wherein the operations further comprise identifying the particular one of the applications that corresponds to the uniform resource locator using the identifier in the uniform resource locator.

29. The non-transitory computer-readable medium of claim 27, wherein the operations further comprise launching the particular one of the applications, in part, by providing at least one of the one or more arguments in the uniform resource locator to the particular one of the applications.

30. The non-transitory computer-readable medium of claim 21, wherein installing the particular one of the applications that corresponds to the uniform resource locator, at the electronic device, comprises installing the data in the set of data for the particular one of the applications.

31. The non-transitory computer-readable medium of claim 21, wherein installing the particular one of the applications that corresponds to the uniform resource locator, at the electronic device, comprises downloading and installing additional data for the particular one of the applications.

32. A method, comprising:

receiving, at an electronic device, a uniform resource locator;

generating a first hash of the uniform resource locator;

determining, using the first hash of the uniform resource locator, whether the uniform resource locator is associated with any of a plurality of applications available from one or more remote servers; and in response to a determination that the uniform resource locator is associated with any of the plurality of applications:

generating a second hash of a first portion of the uniform resource locator;

obtaining, using the second hash of the first portion, a set of data from the one or more remote servers that includes data for at least two of the plurality of applications;

determining whether the uniform resource locator is included in the set of data; and in response to a determination that the uniform resource locator is included in the set of data, installing a particular one of the applications that corresponds to the uniform resource locator, at the electronic device; and in response to a determination that the uniform resource locator is not included in the set of data, navigating to the uniform resource locator with a browser at the electronic device.

33. The method of claim 32, further comprising:

in response to a determination that the uniform resource locator is not associated with any of the plurality of applications, navigating to the uniform resource locator with the browser at the electronic device.

* * * * *